Figure 1:
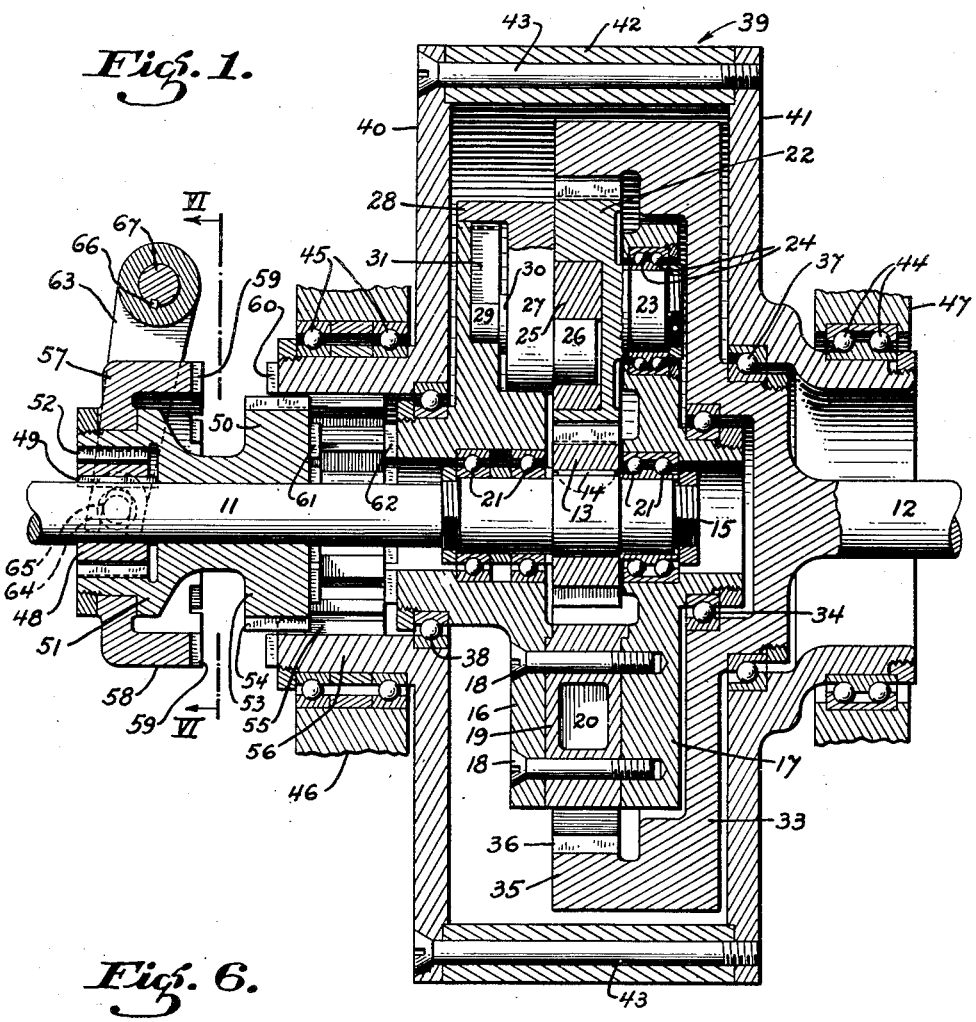

April 25, 1933.  T. H. RYAN  1,906,103
MECHANICAL POWER TRANSMISSION
Filed May 26, 1930   2 Sheets-Sheet 1

INVENTOR.
Thomas H. Ryan.
BY
Townsend, Loftus & Abbett
ATTORNEYS.

April 25, 1933.    T. H. RYAN    1,906,103
MECHANICAL POWER TRANSMISSION
Filed May 26, 1930    2 Sheets-Sheet 2

INVENTOR.
Thomas H. Ryan.
BY
Townsend, Loften + affett
ATTORNEYS.

Patented Apr. 25, 1933

1,906,103

UNITED STATES PATENT OFFICE

THOMAS H. RYAN, OF SAN FRANCISCO, CALIFORNIA, ASSIGNOR OF ONE-SIXTH TO PAUL J. BOYENS AND ONE-SIXTH TO CHARLES J. McCARTHY, BOTH OF SAN FRANCISCO, CALIFORNIA

MECHANICAL POWER TRANSMISSION

Application filed May 26, 1930. Serial No. 455,746.

The invention relates to the transmission of power from a driving member to a driven member, and involves a novel mechanism particularly adapted for use in motor vehicles, although applicable for many other purposes.

An object of the invention is to provide a transmission by means of which changes of speed ratio between the driving and driven members occur as a continuous change and not step by step, as well as to provide a reversing mechanism for use in combination therewith.

Another object of the invention is to provide a transmission which will normally automatically tend to make the driven member rotate at the same number of revolutions per minute as the driving member.

Another object of the invention is to provide a transmission which will normally automatically tend to speed up the driven member when it rotates at a less number of revolutions per minute than the driving member.

Another object of the invention is to provide a transmission which will normally automatically tend to slow down the driven member when it rotates at a greater number of revolutions per minute than the driving member.

Another object of the invention is to provide a transmission which will normally automatically permit the driven member to rotate more slowly on the application of an increased load thereto, as when climbing a steep hill.

Another object of the invention is to provide a transmission which will automatically function as a brake on the driven member when it rotates faster than the driving member.

Another object of the invention is to provide, in combination with a transmission of the type described, a means for causing such transmission to reverse the movement of the driven member.

Other objects will be apparent from the following description:

Mechanism made according to my invention can be substituted for the usual gear shift transmission, and with my invention the clutch may be omitted if desired, but it is sometimes preferable to include the clutch for various purposes, such, for example, as for starting operation of an internal combustion engine.

In the driving of a motor vehicle equipped with my invention, when the road conditions change, the operation is that the speed ratio and torque will accommodate themselves so as to give the most effective results; whereby with any given conditions of resistance or load on the driven parts the maximum driven speed thereof will be attained which is consistent with the conditions of speed and power in the engine at the time, as determined by the throttle or otherwise. If the vehicle should encounter an increase of grade, this increases the load on the driven shaft, thus slowing down the vehicle and the shaft; and this invention utilizes this slowing down, and the consequent increase of speed difference in the driving and driven members, to effect an alteration in the transmitting action such that the required increased torque is delivered, and without the need of attention by the operator. A great range of speed ratio and torque is permitted. When the load is sufficiently light the driven shaft may be rotated at the full speed of the driving shaft, or with a speed ratio of one to one, under which conditions the entire mechanism may rotate as a unit and there will be no play or internal motion of the parts of the transmission and consequently no wear. On the other hand, with increase of load, the ratio may decrease toward or substantially to zero. Control by the engine throttle is additional or supplemental to the self control of the transmission, and by manipulating the throttle the operator can at will increase or decrease the developed power, and speed up or slow down the engine and therefore the driven shaft, this being the only attention required for driving the vehicle under varying conditions.

The present invention is illustrated on the accompanying drawings, of which—

Figure 6:
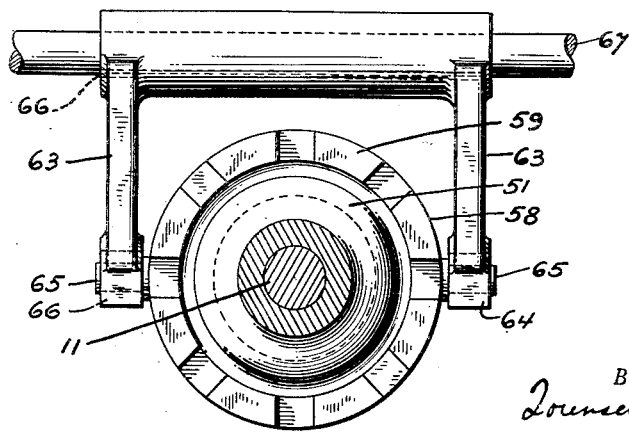
Figure 2:
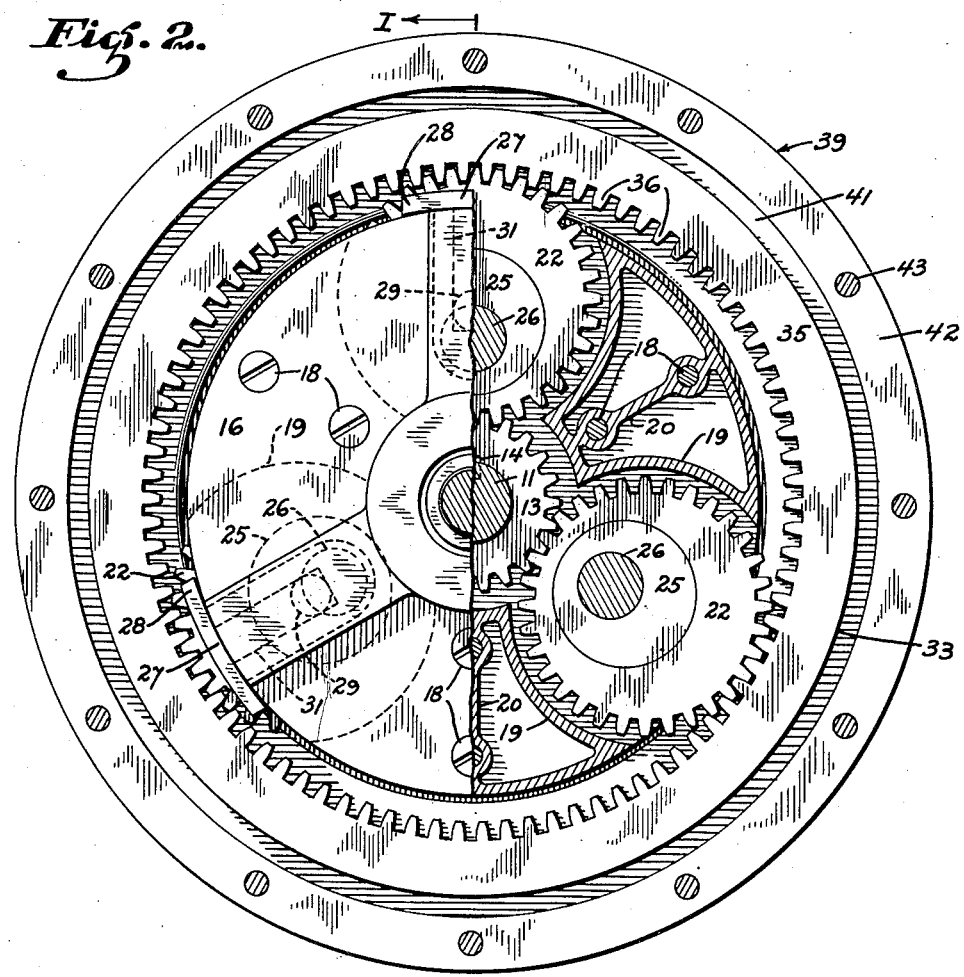
Figure 3:
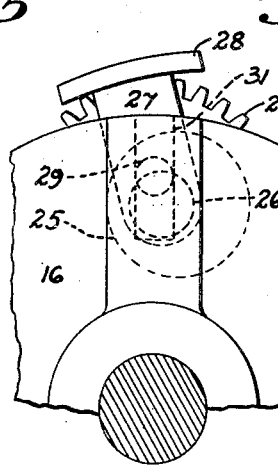
Figure 4:
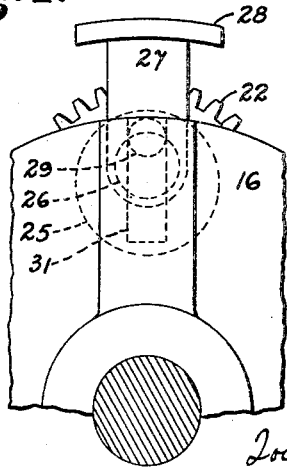
Figure 5:
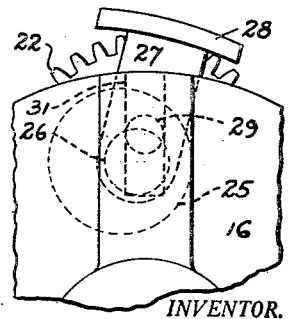

Fig. 1 is a vertical section along the line I—I of Fig. 2 in the direction of arrows, Fig. 2 is an end view from the left side of Fig. 1 with the cover plate removed, and partially in section, Figs. 3, 4 and 5 are end views of a part of the device showing various positions of the weight other than the position shown in Fig. 2, and Fig. 6 is a cross section on the line VI—VI of Fig. 1.

11 designates a driving shaft and 12 is a shaft driven thereby by means of my new transmission. A pinion 13 is secured to the shaft 11 to rotate therewith by means of the key 14, the shaft 11 terminating at 15. A member 16 is mounted on the shaft 11, as is a member 17, the two members 16 and 17 being suitably connected together as by bolts 18 and being spaced from each other by spacer members 19, which are shaped to present a thin web 20 in order to save weight. The housing comprised of the members 16 and 17 is mounted for rotation on and relatively to the shaft 11 by means of the ball bearings 21.

I have shown on the drawings three intermediate gears 22 mounted rotatably in the member 17, each mounted on a hub 23, which is rotatable in the member 17, as by ball bearings 24, it being understood that the number of such gears 22 is not necessarily exactly three. Each of these intermediate gears 22 is hollowed out circularly and eccentrically, the hollow chamber formed thereby accommodating a circular disc 25, which in turn is hollowed out circularly and eccentrically to accommodate a pin 26, which forms a part of the weight member 27, the center of gravity of such weight member being further away from the centers of the driving axle than the axis of the pin 26, the end of the weight member being broadened out as at 28 in order to have the maximum weight possible. On the side of the weight member 27 opposite to that to which the pin 26 is affixed, there is attached thereto a pin 29, which is round for at least a part of the periphery thereof, and which has a shoulder 30 attached to the weight member, so that the pin 29 can ride back and forth in a radial slot 31 formed in the member 16 and partially rotatable therein, the shoulder 30 being broader than the slot and being provided to maintain the proper position of parts.

The member 17 has a projecting hub on which the internal gear 33 is mounted for rotation by means of ball bearings 34, the member 33 being more or less cup-shaped and having an inwardly projecting annular flange 35 provided on its inner face with gear teeth 36 which mesh with the teeth on the intermediate gears 22. The internal gear member 33 is provided axially thereof with a projection which forms the driven shaft, or the driven shaft may be in a separate piece suitably connected thereto.

Mounted for rotation about the member 33 by means of ball bearings 37 and simultaneously for rotation about the member 16 by means of ball bearings 38, is a housing member designated generally by the numeral 39 and comprising side members 40 and 41 and an annular spacing ring 42, the members 40 and 41 being suitably connected together, as by bolts 43 passing through the spacing member 42. The casing member is rotatably mounted, as by means of ball bearings 44 and 45, in supports 46 and 47, which are attached to or which form a part of the automobile frame.

A gear 48 is fixed to the drive shaft 11 for rotation therewith by any suitable means, such for example, as a key 49. Slidable on the shaft 11 is a member having an enlarged head 51 provided interiorly with teeth 52 meshing with the teeth on the gear 48. The member 50 has another enlarged head 53 provided exteriorly with teeth 54 which can slide along the interior teeth 55 on the annulus 56 attached to or forming a part of the side member 40, the teeth 54 being slidable axially of the whole device within the teeth 55 and always being in mesh therewith. The head 51 is provided with an annular groove in which a ring 57 is mounted to permit relative rotational movement between the two members 51 and 57, the ring 57 being provided with an inwardly turned flange 58 provided with gear teeth 59 adapted to be moved into and out of intermeshing relation with corresponding teeth 60 on the end of the annulus 56. The member 50 is provided at its inner end with teeth 61 adapted to be brought into and out of mesh with teeth 62 formed on the member 16.

The operation of my device is as follows: Assuming that the driven shaft 12 is connected to a stationary load about to be started, and that the driving shaft 11 is connected to a source of power, for example, an automobile engine, it is to be noted that when the shaft 11 causes rotation of the pinion 13, which is fixed thereto, then the intermediate pinions 22 will rotate each about its own axis and such axes will move in a circular path about the pinion 13, but slower than the pinion 13 rotates, and thereby lagging somewhat behind it in angular movement. During rotation of the members 22 and due to the eccentric location of the member 25 therein and to the eccentric location of the members 27 in the members 25 and to the positioning of the lug on the member 27 in the slot, the pin 29 will reciprocate back and forth in the slot as the slot rotates about the general center of the complete device, and the weighted ends 28, instead of reciprocating in a straight line, will move in a path as illustrated in Figs. 3, 4 and 5. In Fig. 3, the weight 28 is illustrated as in its upward movement to one side, in Fig. 4 as in its uppermost central position, and in Fig. 5 in its downward movement to the other side, while the position indicated on Fig. 1 is the lowest position it can take, this being central. Such movement takes place only while the intermediate gears 22 are rotating each about its own axis, but after these gears cease rotating each about its own axis with such axes moving in a circular path about the general center of the device at the same speed of rotation as the driving and driven shafts, these weights move through a circular path having the general center of the device as the center of such path. The movement of the axes of the intermediate gears 22 about the general center, but at a slower rate of rotation than that of the driving shaft, will cause a rotation in like direction of the member 33 and of the driven member, which rotation will, in turn, be slower than the circular movement of such axes. While the automobile is accelerating in speed, the movement of these axes about the general center, that is, about the axis of the pinion 13, will accelerate, as will the rotation of the member 33 and of the driven shaft, until the angular speed of each is the same, whereupon the parts rotate about the general center in unison, the pinions 32 no longer rotating each upon its own axis, but each acting somewhat as a fixed spoke between the pinion 13 and the member 35.

The weights 28 are thrown outwardly by two types of centrifugal action, one due to the rotation of the gears 22, each about its own axis, and the other being due to the rotation of these gears about the central axis of the complete device, this throwing outwardly being in each instance in a direction more or less radially away from the center of the device as a whole. The effect of throwing these weights outwardly by such centrifugal forces is to offer a resistance against the rotation of the intermediate gears 22, each about its own axis, so that when a certain speed of rotation thereof is attained, they will no longer rotate, but form a substantially fixed connection between the driving shaft and the driven shaft.

The member 50 is adapted to be moved to the right or to the left, as shown on Fig. 1, by means of lever arms 63 having forked ends 64, partially surrounding and slidably engaging pin members 65 fixed to the ring 57, the arms 63 being suitably attached as by means of keys 66 to a shaft 67, to which a suitable lever (not shown) is attached for throwing the reversing gear into and out of operation.

Fig. 1 shows the device in position for forward movement of the vehicle. When it is desired to reverse the movement of the vehicle, that is, to make it run backwards, the reversing mechanism is thrown to the right, as indicated in Fig. 1, whereupon the teeth of the gear 48 slide out of mesh with the teeth 52, whereupon the teeth 59 move into mesh with the teeth 60 and the teeth 61 move into mesh with the teeth 62. The member 50 is then disconnected, although still upon the shaft 11, and the housing comprised of the members 16 and 17 and the housing 39 are thus held from rotational movement with respect to each other. Rotation of the drive shaft thereupon causes rotation of the intermediate gears 22, each upon its own fixed axis, thus imparting movement to the internal gear 33 and the driven shaft 12, which is in a direction reverse to that of the driving shaft.

It will now be obvious that on forward movement of the vehicle, the driven shaft turns in the same direction as the driving shaft, while it turns in the reverse direction when the movement of the vehicle is reversed; and when the driven shaft rotates faster than the driving shaft, for example, as when an automobile coasts down hill, my device will automatically exert a braking effect.

I have specifically referred to the preferred embodiment of my invention, but it is to be understood that this is illustrative only, and that various changes may be made without departing from the spirit of my invention, the scope of which is defined in the appended claims.

Having described my invention, what I claim and desire to secure by Letters Patent of the United States is—

1. In a power transmission device, the combination of a driving shaft, a driven shaft, a pinion upon one of said shafts, in internal ring gear upon the other of said shafts, a rotatable support journaled between said shafts, a planetating gear journaled upon said support and disposed between said pinion and said ring gear, an eccentrically floating collar journaled in said planetating gear, and an inertia body movably mounted upon said support and engaging with said planetating gear adapted to retard rotation thereof as the angular velocities of said pinion and ring gear approach the same value, said inertia body being supported for radial movement upon said support and journaled in the eccentrically floating collar carried by said planetating gear.

2. In a power transmission device, the combination of a driving shaft, a driven shaft, a pinion upon one of said shafts, an internal ring gear upon the other of said shafts, a rotatable support journaled between said shafts, a plurality of planetating gears journaled upon said support and disposed between said pinion and said ring gear, an eccentrically disposed collar journaled in each of said planetating gears, and inertia bodies eccentrically engaging with each of the collars upon said planetating gears adapted to retard rotation of said latter gears as the angular velocities of said pinion and ring gear approach the same value.

3. In a power transmission device, the combination of a driving shaft and a driven shaft arranged end to end in axial alignment, a pinion upon one of said shafts, an internal ring gear upon the other of said shafts, a rotatable support journaled between said shafts adapted to hold them in alignment, a plurality of planetating gears journaled upon said support and disposed between said pinion and said ring gear, and inertia bodies eccentrically engaging with said planetating gears and radially movable upon said support adapted to retard rotation of said latter gears as the angular velocities of said pinion and ring gear approach the same value, whereby a driving force will be transmitted from said driving shaft through said planetating gears to said driven shaft.

4. In a power transmission device, the combination of a driving shaft, a driven shaft, a pinion upon one of said shafts, an internal ring gear upon the other of said shafts, a freely rotatable support having one portion journaled in concentric relation with said driving and driven shafts at the cooperating ends thereof, a plurality of planetating gears journaled upon said support and disposed between said pinion and said ring gear, an inertia body cooperating with each of said planetating gears slidably mounted in radially disposed guides carried by another portion of said support and adapted to move radially in said guides, and means carried by each of said inertia bodies engaging an adjacent planetating gear at a point eccentric to its normal axis, said inertia bodies being adapted to retard rotation of the planetating gears as the angular velocities of said pinion and ring gears approach the same value.

5. In a power transmission device, the combination of a shaft having a pinion upon the end thereof, a second shaft having a ring gear upon its end located in the same plane with the pinion upon the first shaft, a rotatable support journaled between said pinion and said ring gear, a plurality of planetating gears journaled upon said support and meshing with said pinion and ring gear, and radially movable inertia responsive means carried by said support eccentrically engaging said planetating gears with varying degrees of eccentricity depending upon their radial displacement tending to prevent rotation of the latter gears about their axis, the retarding effect of said inertia means being adapted to increase as the speed of the driven shaft increases.

6. In a power transmission device, the combination of a driving shaft having a pinion upon the end thereof, a driven shaft having a ring gear upon its end located in the same plane with the pinion upon the driving shaft, a support journaled upon one side of said pinion, a plurality of planetating gears journaled upon said support and meshing with said pinion and ring gear, a second support upon the other side of said pinion secured to said first support and adapted to rotate therewith, and radially movable inertia responsive means slidably carried by said second support eccentrically engaging said planetating gears within the plane of their teeth tending to prevent rotation of the latter gears about their axis, the retarding effect of said inertia means being adapted to increase as the speed of the driven shaft increases.

7. In a power transmission device, the combination of a driving shaft having a pinion upon the end thereof, a driven shaft having a ring gear upon its end located in the same radial plane with the pinion upon the driving shaft, a support journaled between said pinion and ring gear adapted to hold them in alignment, a plurality of planetating gears journaled upon said support and meshing with said pinion and ring gear, a second support rigidly secured to said first support and journaled upon the same axis therewith, and inertia responsive means radially movable upon said second support eccentrically engaging said planetating gears tending to prevent rotation of the latter gears about their axis, the retarding effect of said inertia means being adapted to increase as the speed of the driven shaft increases.

8. In a power transmission device, the combination of a driving shaft having a pinion upon the end thereof, a driven shaft having a ring gear upon its end located in the same radial plane with the pinion upon the driving shaft, a rotatable support journaled between said pinion and ring gear, a planetating gear journaled upon said support and meshing with said pinion and ring gear, a second support rigidly secured to said first support and journaled upon the same axis therewith, and a radially movable inertia responsive means carried by said second support eccentrically engaging said planetating gear tending to prevent rotation of the latter gear about its axis, the retarding effect of said inertia means being adapted to increase as the speed of the driven shaft increases.

9. In a planetating gear transmission device, the combination of a pair of axially aligned shafts, a ring gear upon one of said shafts, a pinion disposed in the plane of said ring gear upon the other of said shafts, a plurality of planetating gears disposed between said ring gear and said pinion, a radially movable inertia body journaled eccentrically to each of said planetating gears, and means whereby the journaled connection between each of said inertia bodies and its planetating gear will change in eccentricity as the inertia bodies move radially under the influence of centrifugal force and said planetating gears rotate.

10. In a planetating gear transmission device, the combination of a pair of axially aligned shafts, a ring gear upon one of said shafts, a pinion disposed in the plane of said ring gear upon the other of said shafts, a plurality of planetating gears disposed between said ring gear and said pinion, a radially movable inertia body journaled eccentrically to each of said planetating gears, and means whereby the eccentricity of each of said inertia bodies with respect to its cooperating planetating gear will change as the inertia body moves radially under the influence of centrifugal force.

THOMAS H. RYAN.